United States Patent
Narita

(10) Patent No.: US 11,010,989 B2
(45) Date of Patent: May 18, 2021

(54) ELECTRONIC DEVICE AND PROCESSING METHOD FOR ELECTRONIC DEVICE

(71) Applicant: ALPINE ELECTRONICS, INC., Tokyo (JP)

(72) Inventor: Koichi Narita, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/568,936

(22) Filed: Sep. 12, 2019

(65) Prior Publication Data

US 2020/0090421 A1  Mar. 19, 2020

(30) Foreign Application Priority Data

Sep. 13, 2018  (JP) .............................. JP2018-171484

(51) Int. Cl.
| | |
|---|---|
| *G07C 5/00* | (2006.01) |
| *H02J 7/00* | (2006.01) |
| *H04B 1/3822* | (2015.01) |
| *B60R 21/013* | (2006.01) |
| *H04W 4/90* | (2018.01) |
| *B60R 16/033* | (2006.01) |

(52) U.S. Cl.
CPC ............ *G07C 5/008* (2013.01); *B60R 16/033* (2013.01); *B60R 21/013* (2013.01); *H02J 7/0063* (2013.01); *H04B 1/3822* (2013.01); *H04W 4/90* (2018.02)

(58) Field of Classification Search
CPC ..... H02J 7/00; H02J 7/02; H02J 7/025; B60R 16/033; B60R 21/013; G01R 31/36
USPC .............. 307/9.1, 10.1, 10.7, 66, 64, 80, 82; 320/145, 137, 150, 155; 702/63
See application file for complete search history.

(56) References Cited

U.S. PATENT DOCUMENTS

| | | | |
|---|---|---|---|
| 6,721,580 B1 | 4/2004 | Moon | |
| 2004/0104709 A1* | 6/2004 | Yamaji | G06F 1/3268 |
| | | | 320/150 |

(Continued)

FOREIGN PATENT DOCUMENTS

| | | |
|---|---|---|
| CN | 206 610 889 | 11/2017 |
| EP | 1 530 383 | 5/2005 |

(Continued)

OTHER PUBLICATIONS

Extended European Search Report for 19197013.6 dated Jan. 30, 2020, 6 pgs.

*Primary Examiner* — Nguyen Tran
*Assistant Examiner* — Jagdeep S Dhillon
(74) *Attorney, Agent, or Firm* — Brinks Gilson & Lione

(57) ABSTRACT

An electronic device performs an emergency call operation using a secondary battery as a power source, and includes a temperature sensor which detects a temperature of the secondary battery, an intermittent emergency call processing unit which performs the emergency call operation intermittently when the temperature detected by the temperature sensor is in a low-temperature state lower than a predetermined value, and a continuous emergency call processing unit which performs the emergency call operation continuously when the temperature detected by the temperature sensor is higher than the predetermined value.

16 Claims, 3 Drawing Sheets

(56) References Cited

U.S. PATENT DOCUMENTS

| | | | |
|---|---|---|---|
| 2010/0213901 A1* | 8/2010 | Morimoto | B60L 8/003 |
| | | | 320/145 |
| 2011/0112782 A1* | 5/2011 | Majima | H02J 7/0029 |
| | | | 702/63 |
| 2013/0013937 A1 | 1/2013 | Koshimizu | |
| 2013/0106594 A1 | 5/2013 | Hiramatsu et al. | |
| 2014/0365807 A1* | 12/2014 | Nakano | G06F 1/26 |
| | | | 713/340 |
| 2015/0015076 A1* | 1/2015 | Park | H02J 7/0018 |
| | | | 307/66 |
| 2017/0194670 A1* | 7/2017 | Kawano | H01M 10/4257 |
| 2019/0094305 A1* | 3/2019 | Takechi | G01R 31/364 |
| 2019/0207404 A1* | 7/2019 | Yoshinaga | H01M 10/613 |
| 2019/0386350 A1* | 12/2019 | Sato | H01M 10/486 |
| 2019/0393451 A1* | 12/2019 | Ishihara | H01M 10/613 |
| 2020/0062175 A1* | 2/2020 | Lee | B60Q 1/52 |
| 2020/0091736 A1* | 3/2020 | Ishihara | H02M 3/158 |
| 2020/0094707 A1* | 3/2020 | Fukushima | B60L 3/12 |

FOREIGN PATENT DOCUMENTS

| | | |
|---|---|---|
| JP | 10-285813 | 10/1998 |
| JP | 2013037672 | 2/2013 |

* cited by examiner

ELECTRONIC DEVICE AND PROCESSING METHOD FOR ELECTRONIC DEVICE

RELATED APPLICATION

The present application claims priority to Japanese Patent Application Number 2018-171484, filed Sep. 13, 2018, the entirety of which is hereby incorporated by reference.

BACKGROUND

1. Field of the Invention

The present invention relates to an electronic device and a processing method for the electronic device which is mounted in a vehicle to perform an emergency call.

2. Description of the Related Art

Recently, a vehicle called a "connected car" having a function of normally connecting to the Internet has been put into practical use, and a TCU (telematics control unit) is used to process communication. The TCU has a GPS receiver built in, and transfers position information of the vehicle and vehicle information to a cloud server so as to cope with an emergency call when an accident occurs or to support a situation when the vehicle operation is abnormal.

A power supply line supplying operation power from an in-vehicle battery to the TCU may be cut when an accident occurs, or a connection may be disengaged. Even if such a situation occurs, a built-in secondary battery may be provided in the TCU in order to continue an operation such as an emergency call. As a built-in secondary battery, a lithium ion battery and a nickel hydrogen battery are known. In the case of the TCU, the nickel hydrogen battery may be used in many cases.

In general, the secondary battery has a property that an internal impedance increases at a low temperature. For example, the operation power is switched from the in-vehicle battery to the built-in secondary battery when an abnormality occurs in the power supply line at a low temperature such as −30° C. Therefore, even if the operation such as the emergency call starts, the output voltage is steeply lowered, and thus the operation such as the emergency call cannot continue.

As a related art for preventing the reduction in operating time of an electronic device using the secondary battery at a low temperature, there is disclosed a technique that a heater is energized when a low-temperature state is detected so as to increase the temperature of the secondary battery in order to improve a discharge characteristic of the secondary battery (for example, see JP 10-285813 A and JP 2013-37672 A). However, in a case where the same secondary battery is used as the power source of the heater, there is a need for a larger capacity of the secondary battery; also, with the heater installed the configuration is increased in size. In particular, such a defect does not occur in a case where the connection of the power supply line is kept and it is not extremely low temperature. Therefore, increasing the capacity of the secondary battery or installing a heater only as a countermeasure to low temperature is not desirable from a viewpoint of cost reduction because the countermeasure requires a greater cost.

SUMMARY

The present disclosure has been made in view of such a problem, and an object thereof is to provide an electronic device and a processing method for the electronic device which can lengthen an operating time using a secondary battery without causing a large-scaled configuration.

In order to solve the above problem, an electronic device of the present disclosure performs a predetermined process using a secondary battery as a power source. The electronic device includes a temperature detection unit which detects a temperature of the secondary battery, a low-temperature determination unit which determines whether the temperature detected by the temperature detection unit is lower/higher than a predetermined value, an intermittent processing unit which performs the predetermined process intermittently when the temperature detected by the temperature detection unit is lower than the predetermined value, and a continuous processing unit which performs the predetermined process continuously when the temperature detected by the temperature detection unit is higher than the predetermined value.

A processing method for the electronic device of the present disclosure uses a secondary battery as a power source. The method includes determining, by a low-temperature determination unit, whether a temperature of the secondary battery detected by a temperature detection unit is lower/higher than a predetermined value, performing, by an intermittent processing unit, the predetermined process intermittently when the temperature detected by the temperature detection unit is lower than the predetermined value, and performing, by a continuous processing unit, the predetermined process continuously when the temperature detected by the temperature detection unit is higher than the predetermined value.

The predetermined process is intermittently performed at a low temperature at which the internal resistance of the secondary battery increases, so that the terminal voltage of the secondary battery can be recovered regularly. Therefore, it is possible to lengthen the operating time using the secondary battery as a total operating time of a predetermined process without causing a large-scale configuration such as the capacity increase of the secondary battery or the additional heater.

In addition, there is provided a voltage detection unit which detects the above-described terminal voltage of the secondary battery. If an operating time when the predetermined process is performed is set to T1, and a non-operating time when the process is stopped is set to T2, it is desirable that the intermittent processing unit changes the non-operating time T2 to a time T3 longer than before when the terminal voltage detected by the voltage detection unit becomes lower than a predetermined threshold. With such a configuration, even in a case where the residual capacity of the secondary battery is lowered to make the terminal voltage low, the voltage can be recovered, and the operating time can be lengthened still more using the secondary battery.

In addition, it is desirable that the intermittent processing unit changes the non-operating time T2 to a time T4 longer than T3 when the terminal voltage detected by the voltage detection unit becomes lower than the predetermined threshold again. Even in a case where the terminal voltage of the secondary battery is further lowered by lengthening the non-operating time again in the intermittent operation according to a degree of the reduction of the terminal voltage, the terminal voltage can be recovered.

In addition, it is desirable that power starts to be supplied from the secondary battery when power supply from an external power source is stopped. In addition, it is desirable to further provide a power control unit which starts supplying power using the secondary battery when detecting that the above-described power supply from the external power source is stopped. In the case of the electronic device operating with power supplied from the external power source, the capacity of the secondary battery as an auxiliary power source normally tends to decrease, and the terminal voltage is lowered at a low temperature. Even in such a case, the predetermined process can be intermittently performed, so that it is possible to secure a total operating time to some degree.

In addition, it is desirable that the external power source is the battery of the device-mounted vehicle. With such a configuration, it is possible to perform the process continuously by the power supplied from the battery in normal conditions, and to transition to the intermittent process in an abnormal condition where battery disengagement occurs.

In addition, it is desirable that the predetermined process performed by the intermittent processing unit and the continuous processing unit is an emergency call operation which is performed when an abnormality of a device-mounted vehicle occurs. In addition, there is provided an airbag detection unit which detects the operation of an airbag of the vehicle. The emergency call operation is desirably performed when the airbag detection unit detects the operation of the airbag. With such a configuration, even in a case where an abnormality occurs in the vehicle at a low temperature (particularly, when an accident occurs), the emergency call operation can be performed as long as possible to the end without termination in the middle of the operation.

DETAILED DESCRIPTION OF THE PREFERRED EMBODIMENTS

Hereinafter, an electronic device of an embodiment to which the invention is applied will be described with reference with the drawings.

Figure 1:
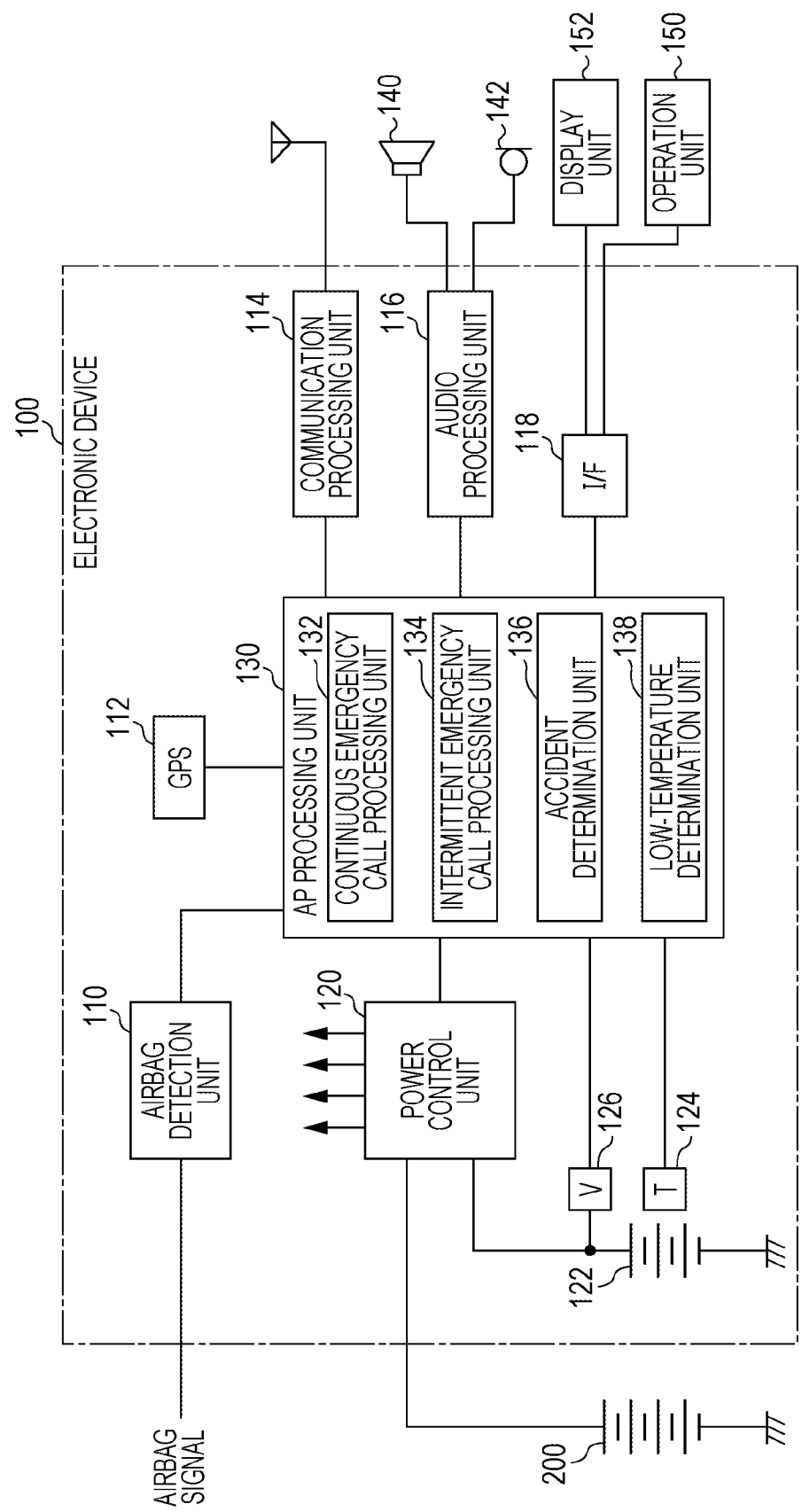
FIG. 1 is a diagram illustrating an electronic device of an embodiment.

FIG. 1 is a diagram illustrating the electronic device of an embodiment. The electronic device 100 illustrated in FIG. 1 is, for example, a TCU which is mounted in a vehicle, and has a function of wirelessly connecting a user to a call center (not illustrated) when the user (a driver of the vehicle) has trouble so as to cope with the trouble through position information of the vehicle or conversation with an operator.

The electronic device 100 includes an airbag detection unit 110, a GPS receiver 112, a communication processing unit 114, an audio processing unit 116, an interface unit 118, a power control unit 120, a secondary battery 122, a temperature sensor 124, a voltage sensor 126, and an application processing unit (AP processing unit) 130.

The airbag detection unit 110 detects that an airbag (not illustrated) of the vehicle operates when an accident occurs. The GPS receiver 112 detects a position of the vehicle in which the electronic device 100 is mounted.

The communication processing unit 114 is a NAD (Network Access Device) and performs, for example, a transfer processing of information with respect to the call center which is a transfer destination of an emergency call.

The audio processing unit 116 performs audio processing and, for example, decodes audio data into an analog audio signal to output the data from a speaker 140 and encodes the sound of user collected by a microphone 142 to be converted into digital audio data.

The interface unit 118 is connected to an operation unit 150 and a display unit 152 which are operated by the user, and inputs or outputs a signal between them.

The power control unit 120 performs control to start the power supply from the secondary battery 122 as an auxiliary power source built in the electronic device 100 when power supplied from an in-vehicle battery 200 as an external power source is stopped. The electronic device 100 of this embodiment is operated by the power supply from the battery 200. However, disconnection of a power supply line connected to the battery 200 (battery cable), terminal disengagement of the battery 200, or damage to the battery 200 may occur, and thus the power supply from the battery 200 may be disabled. Because of the possibility of such a case, the secondary battery 122 is provided. Further, such disconnection, terminal disengagement, or damage may occur in an accident (collision, etc.) of the vehicle, but may occur during normal traveling. In addition, for example, a nickel hydrogen battery (Ni-MH) used as the secondary battery 122. Other types of secondary batteries such as a lithium ion battery may be used.

The temperature sensor 124 detects a temperature of the secondary battery 122. The voltage sensor 126 detects a terminal voltage of the secondary battery 122.

The application processing unit 130 controls the entire electronic device 100 and is realized by causing a CPU to execute a predetermined application program which is stored in a ROM or a RAM. In the application processing unit 130, a continuous emergency call processing unit 132 and an intermittent emergency call processing unit 134 are included as two types of emergency call processing units, and an accident determination unit 136 to determine whether an accident occurs and a low-temperature determination unit 138 are included. The continuous emergency call processing unit 132 performs a predetermined emergency call operation in a "continuous" manner when a temperature of the secondary battery 122 detected by the temperature sensor 124 is higher than a predetermined value (for example, −20° C.). In addition, the intermittent emergency call processing unit 134 performs the predetermined emergency call operation in an "intermittent" manner when a temperature of the secondary battery 122 detected by the temperature sensor 124 is in a low-temperature state lower than the predetermined value (for example, −20° C.). Further, "continuous" when performing the emergency call operation means "continuously performing the predetermined emergency call operation from the start to the end". In addition, "intermittent" when performing the emergency call operation means "dividing the predetermined emergency call operation into plural operations and sequentially performing each divided emergency call operation with a standby time between operations". The accident determination unit 136 determines whether an accident occurs according to an operation state of the airbag. The low-temperature determination unit 138 determines whether the temperature of the secondary battery 122 detected by the temperature sensor 124 is lower or higher than the predetermined value (whether it is low).

The above-described temperature sensor 124 corresponds to a temperature detection unit, the low-temperature determination unit 138 corresponds to a low-temperature determination unit, the intermittent emergency call processing unit 134 corresponds to an intermittent processing unit, the continuous emergency call processing unit 132 corresponds to a continuous processing unit, the voltage sensor 126 corresponds to a voltage detection unit, the power control unit 120 corresponds to a power control unit, and the airbag detection unit 110 corresponds to an airbag detection unit, respectively.

Next will be described an operation in which the power supply from the battery 200 is stopped at a low temperature so as to be switched to the power supply from the secondary battery 122.

Figure 2:
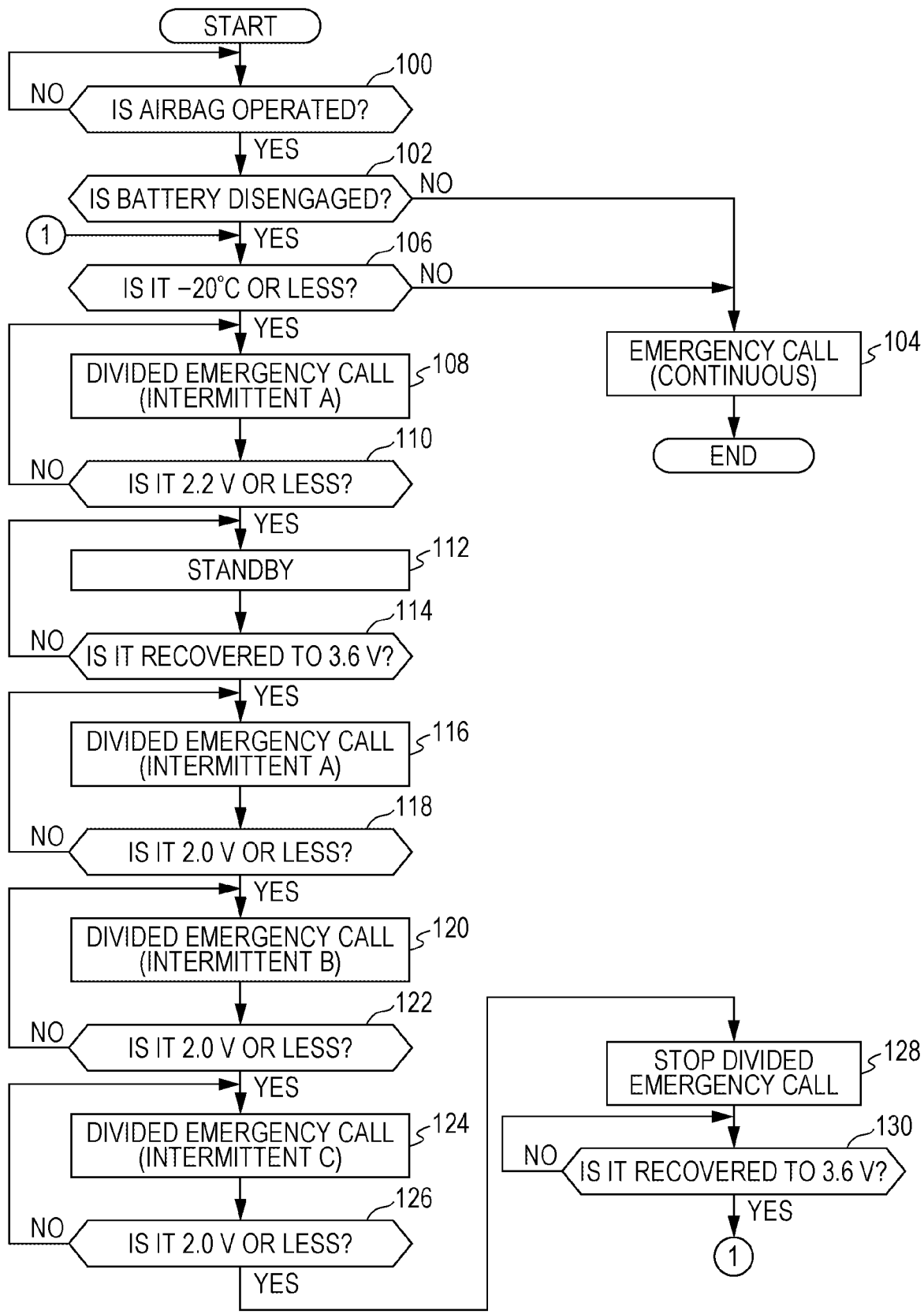
FIG. 2 is a flowchart illustrating an operation sequence of an emergency call when an accident occurs.

FIG. 2 is a flowchart illustrating an operation sequence of the emergency call when an accident occurs. The accident determination unit 136 determines whether the airbag is operated (Step 100). In a case where the airbag is not operated, a negative determination is made. This determination is repeatedly performed. In addition, if the airbag is operated in an accident of the vehicle in which the electronic device 100 is mounted, a positive determination is made in Step 100.

Next, the power control unit 120 determines whether battery disengagement (stopping of operation power supplied from the battery 200) occurs (Step 102). In a case where the battery disengagement does not occur, a negative determination is made. In this case, the continuous emergency call processing unit 132 performs a continuous emergency call operation in which a position of the subject vehicle detected by a GPS device 112 and detailed information of an accident are included (Step 104).

In a case where the battery disengagement occurs, a positive determination is made in Step 102. Next, the low-temperature determination unit 138 determines whether the temperature of the secondary battery 122 is a temperature equal to or less than the predetermined value (for example, −20° C.) (Step 106). In a case where the temperature is higher than the predetermined value, and not a low temperature, a negative determination is made. In this case, the process proceeds to Step 104, and the continuous emergency call operation is performed by the continuous emergency call processing unit 132.

In a case where the temperature is lower than the predetermined value, and the temperature of the secondary battery 122 is low, a positive determination is made in Step 106. In this case, the intermittent emergency call processing unit 134 performs an intermittent emergency call operation in which the position of the subject vehicle detected by a GPS device 112 and detailed information of an accident are included (Step 108). For example, if an operating time for each one of a plurality of divided emergency call operations is set to T1 and a non-operating time (a time when the emergency call operation is suspended) is set to T2, T1=10 seconds and T2=60 seconds, and the intermittent emergency call operation (intermittent A) is performed.

The intermittent emergency call processing unit 134 determines whether the terminal voltage of the secondary battery 122 becomes equal to or less than 2.2 V on the basis of the detection result of the voltage sensor 126 in parallel with the intermittent emergency call operation (Step 110). In this embodiment, if the terminal voltage before discharging is 3.6 V, and the terminal voltage is gradually reduced to 1.8 V as the discharging progresses, the application processing unit 130 is forcibly reset. In a case where the terminal voltage of the secondary battery 122 is higher than 2.2 V, a negative determination is made in Step 110. In this case, the process returns to Step 108, and the intermittent emergency call operation continues.

If the terminal voltage of the secondary battery 122 is reduced to 2.2 V or less, a positive determination is made in Step 110. In this case, the intermittent emergency call processing unit 134 terminates the intermittent emergency call operation and moves to a standby state (Step 112). The emergency call operation is performed when a signal is transferred with respect to the communication processing unit 114. Therefore, power consumption is relatively large. If this operation continues, the terminal voltage of the secondary battery 122 is lowered particularly at a low temperature. However, if an operation having large power consumption is terminated and the operation proceeds to the standby state, the terminal voltage of the secondary battery 122 is gradually recovered.

Next, the intermittent emergency call processing unit 134 determines whether the terminal voltage of the secondary battery 122 is recovered up to 3.6 V (Step 114). In a case where the terminal voltage is not recovered, a negative determination is made, and the standby state of Step 112 continues. If the standby state continues for a longer time, and the terminal voltage of the secondary battery 122 is recovered up to 3.6 V, a positive determination is made in Step 114. Thereafter, the intermittent emergency call processing unit 134 restarts the intermittent emergency call operation performed in Step 108 (the intermittent emergency call operation with T1=10 seconds and T2=60 seconds (intermittent A)) (Step 116).

In addition, the intermittent emergency call processing unit 134 determines whether the terminal voltage of the secondary battery 122 becomes equal to or less than 2.0 V, lower than that of the previous process (Step 110), in parallel with the intermittent emergency call operation (Step 118). In a case where the terminal voltage of the secondary battery 122 is higher than 2.0 V, a negative determination is performed. In this case, the process returns to Step 116, and the intermittent emergency call operation continues.

If the terminal voltage of the secondary battery 122 becomes equal to or less than 2.0 V, a positive determination is made in Step 118. In this case, an intermittent emergency call processing unit 134 performs the intermittent emergency call operation in which the non-operating time T2 is lengthened (Step 120). For example, the non-operating time T2 (60 seconds) is set to T3 (for example, 120 seconds), longer than before while keeping the operating time T1 (10 seconds) for each one of the plurality of divided emergency call operations, and the intermittent emergency call operation (intermittent B) is performed. In this configuration, the non-operating time T2 is changed to be a longer time T3 to easily recover the terminal voltage of the secondary battery 122. Therefore, the terminal voltage will hardly be lowered to 2.0 V.

Thereafter, the intermittent emergency call processing unit 134 determines again whether the terminal voltage of the secondary battery 122 becomes equal to or less than 2.0 V in parallel with the intermittent emergency call operation (Step 122). In a case where the terminal voltage of the secondary battery 122 is higher than 2.0 V, a negative determination is performed. In this case, the process returns to Step 120, and the intermittent emergency call operation (intermittent B) continues.

If the terminal voltage of the secondary battery 122 becomes equal to or less than 2.0 V again, a positive determination is made in the determination of Step 122. In this case, an intermittent emergency call processing unit 134 performs the intermittent emergency call operation in which the non-operating time T3 is further lengthened (Step 124). For example, the non-operating time T3 (120 seconds) is further lengthened to be T4 (for example, 180 seconds) while maintaining the operating time T1 (10 seconds) for each one time in the emergency call operation divided in plural times, and the intermittent emergency call operation (intermittent C) is performed. In this configuration, the non-operating time T3 is changed to a longer T4, so that the terminal voltage of the secondary battery 122 of which the residual capacity is lowered can be easily recovered.

Thereafter, the intermittent emergency call processing unit 134 determines again whether the terminal voltage of the secondary battery 122 becomes equal to or less than 2.0 V in parallel with the intermittent emergency call operation (Step 126). In a case where the terminal voltage of the secondary battery 122 is higher than 2.0 V, a negative determination is performed. In this case, the process returns to Step 124, and the intermittent emergency call operation (intermittent C) continues.

If the terminal voltage of the secondary battery 122 becomes equal to or less than 2.0 V again (third time), a positive determination is made in Step 126. In this case, the intermittent emergency call processing unit 134 stops the intermittent emergency call operation and moves to a standby state (Step 128). Thereafter, the intermittent emergency call processing unit 134 determines whether the terminal voltage of the secondary battery 122 has recovered up to 3.6 V in the standby state (Step 130). In a case where the terminal voltage is not recovered, a negative determination is performed, and this determination is repeatedly performed. If the terminal voltage of the secondary battery 122 is recovered up to 3.6 V, a positive determination is made in Step 130. In this case, the process proceeds to Step 106, and the operation after the low-temperature determination is repeatedly performed.

Figure 3:
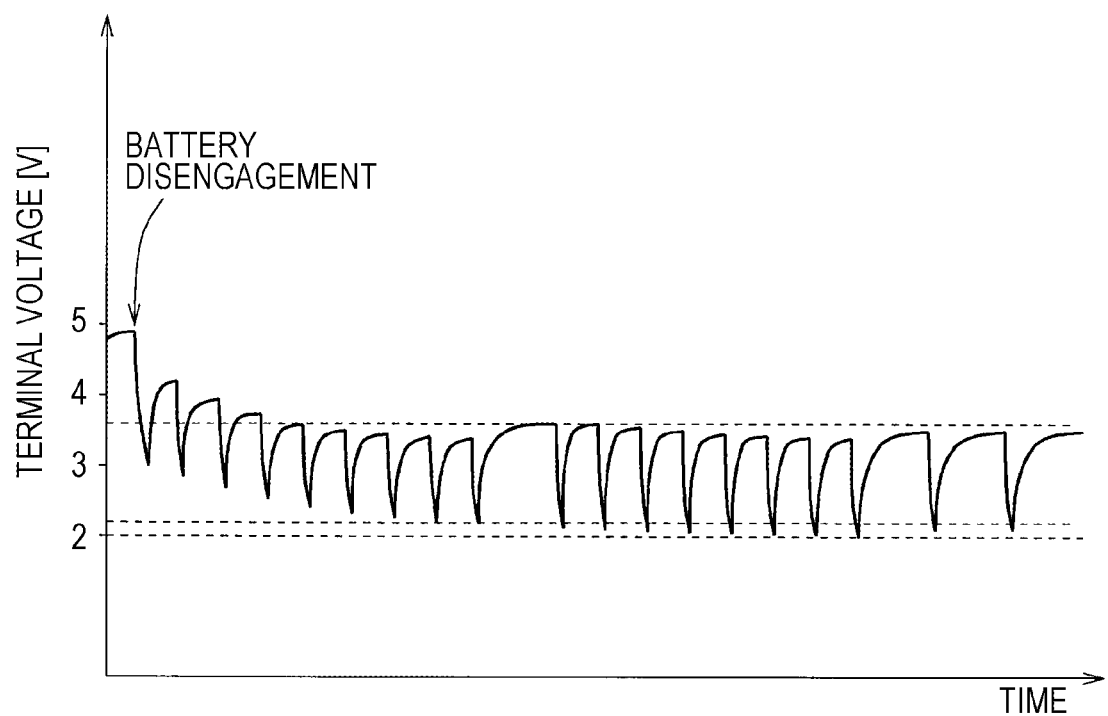
FIG. 3 is a diagram illustrating a transition of a terminal voltage in a case where an emergency call operation is intermittently performed at a low temperature.

FIG. 3 is a diagram illustrating a transition of the terminal voltage of the secondary battery 122 in a case where the intermittent emergency call operation is performed at a temperature lower than −20° C. As illustrated in FIG. 3, with the emergency call operation, the terminal voltage of the secondary battery 122 is steeply lowered. However, the terminal voltage can be recovered by controlling the subsequent non-operating time.

In this way, in the electronic device 100 of this embodiment, the emergency call operation is performed intermittently at a low temperature (−20° C. or less) at which the internal resistance of the secondary battery 122 is increased, so that the terminal voltage of the secondary battery 122 can be recovered regularly. Therefore, the operating time can be lengthened using the secondary battery 122 as a total operating time of the emergency call operation instead of preparing a countermeasure leading to a large-scale configuration such as the capacity increase of the secondary battery 122 or an additional heater.

In addition, when the terminal voltage of the secondary battery 122 drops to 2.0 V or less, the non-operating time T2 in the intermittent emergency call operation is changed to a time T3 longer than before, so that the terminal voltage can be recovered even in a case where the residual capacity of the secondary battery 122 is lowered and thus the terminal voltage is lowered. The operating time can be lengthened still more using the secondary battery 122.

In addition, when the terminal voltage of the secondary battery 122 drops again to 2.0 V, the non-operating time T3 in the intermittent emergency call operation is changed to a time T4 still longer, so that the terminal voltage can be recovered even in a case where the terminal voltage of the secondary battery 122 is lowered again.

When the power supply from the battery 200 as an external power source is stopped, the power supply from the secondary battery 122 starts. Therefore, the power control unit 120 is provided. In the case of the electronic device 100 operating with power supplied from the battery 200, the capacity of the secondary battery 122 as an auxiliary power source normally tends to decrease, and the terminal voltage is lowered at a low temperature. Even in such a case, the emergency call operation can be intermittently performed, so that it is possible to secure a total operating time to some degree.

When the airbag detection unit 110 detects the operation of an airbag, the emergency call operation is performed. Even in a case where the vehicle has an accident at a low temperature, the emergency call operation can be performed as long as possible to the end without termination in the middle of the operation.

The invention is not limited to the above embodiment. For example, the above embodiment has been described in connection with the electronic device 100 which operates as a TCU mounted in the vehicle. However, the invention can be applied to any other electronic devices if the device normally operates with power supplied from an external power source (the power may be supplied not only from the battery but also from a household wall outlet), and operates with the power supplied from the secondary battery when the power supply is stopped.

In addition, although the above embodiment has been described in a case where the emergency call operation is performed, a predetermined process performed by the intermittent processing unit and the continuous processing unit is not limited to the emergency call operation, but may be other processes.

In the above embodiment, voltage values of 3.6 V, 2.2 V, and 2.0 V are used as comparison targets of the terminal voltage of the secondary battery 122, but the invention is not limited thereto. The voltages may be appropriately changed according to the type or the capacity of the secondary battery.

As described above, according to the invention, a predetermined process is intermittently performed at a low temperature at which the internal resistance of the secondary battery increases, so that the terminal voltage of the secondary battery can be recovered regularly. Therefore, it is possible to lengthen the operating time using the secondary battery as a total operating time of a predetermined process without requiring a large-scale configuration such as the capacity increase of the secondary battery or the additional heater.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An electronic device which performs a predetermined process using a secondary battery as a power source, comprising:

a temperature detection unit configured to detect a temperature of the secondary battery;
a low-temperature determination unit configured to determine whether the temperature detected by the temperature detection unit is lower/higher than a predetermined value;
an intermittent processing unit configured to perform the predetermined process intermittently when the temperature detected by the temperature detection unit is lower than the predetermined value; and
a continuous processing unit configured to perform the predetermined process continuously when the temperature detected by the temperature detection unit is higher than the predetermined value;
wherein the predetermined process performed by the intermittent processing unit and the continuous processing unit is an emergency call operation which is performed when an abnormality of a device-mounted vehicle occurs.

2. The electronic device according to claim 1, further comprising:
a voltage detection unit configured to detect a terminal voltage of the secondary battery,
wherein, if an operating time when the predetermined process is performed is set to T1, and a non-operating time when the process is stopped is set to T2, the intermittent processing unit changes the non-operating time T2 to a time T3 longer than T2 when the terminal voltage detected by the voltage detection unit becomes lower than a predetermined threshold.

3. The electronic device according to claim 2,
wherein, when the terminal voltage detected by the voltage detection unit becomes lower than the predetermined threshold again, the intermittent processing unit changes the non-operating time T2 to a time T4 longer than time T3.

4. The electronic device according to claim 3,
wherein power starts to be supplied from the secondary battery when power supplied from an external power source is stopped.

5. The electronic device according to claim 4, further comprising:
a power control unit configured to start supplying power using the secondary battery when detecting that the power supplied from the external power source is stopped.

6. The electronic device according to claim 5,
wherein the external power source is a battery of a device-mounted vehicle.

7. The electronic device according to claim 1, further comprising:
an airbag detection unit configured to detect an operation of an airbag of the vehicle,
wherein the emergency call operation is performed when the airbag detection unit detects the operation of the airbag.

8. The electronic device according to claim 1,
wherein power starts to be supplied from the secondary battery when power supplied from an external power source is stopped.

9. The electronic device according to claim 8, further comprising:
a power control unit configured to start supplying power using the secondary battery when detecting that the power supplied from the external power source is stopped.

10. The electronic device according to claim 9,
wherein the external power source is a battery of a device-mounted vehicle.

11. The electronic device according to claim 2, further comprising:
an airbag detection unit configured to detect an operation of an airbag of the vehicle,
wherein the emergency call operation is performed when the airbag detection unit detects the operation of the airbag.

12. The electronic device according to claim 2,
wherein power starts to be supplied from the secondary battery when power supplied from an external power source is stopped.

13. The electronic device according to claim 12, further comprising:
a power control unit configured to start supplying power using the secondary battery when detecting that the power supplied from the external power source is stopped.

14. The electronic device according to claim 13,
wherein the external power source is a battery of a device-mounted vehicle.

15. The electronic device according to claim 14, further comprising:
an airbag detection unit configured to detect an operation of an airbag of the vehicle,
wherein the emergency call operation is performed when the airbag detection unit detects the operation of the airbag.

16. A processing method of an electronic device which uses a secondary battery as a power source, comprising:
determining, by a low-temperature determination unit, whether a temperature of the secondary battery detected by a temperature detection unit is lower/higher than a predetermined value;
performing, by an intermittent processing unit, a predetermined process intermittently when the temperature detected by the temperature detection unit is lower than the predetermined value; and
performing, by a continuous processing unit, the predetermined process continuously when the temperature detected by the temperature detection unit is higher than the predetermined value;
wherein the predetermined process performed by the intermittent processing unit and the continuous processing unit is an emergency call operation which is performed when an abnormality of a device-mounted vehicle occurs.

* * * * *